US010880372B2

(12) United States Patent
Nelson et al.

(10) Patent No.: US 10,880,372 B2
(45) Date of Patent: Dec. 29, 2020

(54) BLENDED OPERATIONAL TRANSFORMATION FOR MULTI-USER COLLABORATIVE APPLICATIONS

(71) Applicant: Microsoft Technology Licensing, LLC, Redmond, WA (US)

(72) Inventors: David Lee Nelson, Redmond, WA (US); Adam Davis Kraft, Somerville, MA (US); Erin Rebecca Rhode, San Francisco, CA (US); Amal Kumar Dorai, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/225,252

(22) Filed: Dec. 19, 2018

(65) Prior Publication Data
US 2019/0124150 A1 Apr. 25, 2019

Related U.S. Application Data

(63) Continuation of application No. 14/966,216, filed on Dec. 11, 2015, now Pat. No. 10,171,581.
(Continued)

(51) Int. Cl.
*G06F 15/16* (2006.01)
*H04L 29/08* (2006.01)
(Continued)

(52) U.S. Cl.
CPC ........ *H04L 67/1095* (2013.01); *G06F 16/178* (2019.01); *G06F 16/1767* (2019.01);
(Continued)

(58) Field of Classification Search
CPC ........... H04W 72/042; H04W 72/0446; H04W 4/021; H04W 24/08; H04W 24/10
See application file for complete search history.

(56) References Cited

U.S. PATENT DOCUMENTS

| 5,461,631 A | 10/1995 | Blaum et al. |
| 5,623,519 A | 4/1997 | Babcock et al. |

(Continued)

FOREIGN PATENT DOCUMENTS

| CN | 102262620 A | 11/2011 |
| CN | 103109323 A | 5/2013 |
| CN | 104462037 | 3/2015 |

OTHER PUBLICATIONS

"Office Action Issued in European Patent Application No. 15825882.2", dated May 31, 2019, 8 Pages.
(Continued)

*Primary Examiner* — Brian Whipple
*Assistant Examiner* — Gregory P Tolchinsky
(74) *Attorney, Agent, or Firm* — Merchant & Gould P.C.

(57) ABSTRACT

Multi-user collaborative software applications may synchronize data between multiple users or multiple devices. There are multiple existing ways to synchronize data. Some of these synchronization methods, such as file locking, are easy to implement but have performance or functionality drawbacks. Operational transformation (OT) is a high performance synchronization method, but difficult and time-consuming to implement in many cases, and cannot be partially implemented throughout a system. Methods and systems provide for blending operational transformation with other synchronization methods in the same collaborative software application, allowing operational transformation to be used in situations where it cannot be implemented throughout a system.

20 Claims, 10 Drawing Sheets

Related U.S. Application Data

(60) Provisional application No. 62/090,621, filed on Dec. 11, 2014.

(51) Int. Cl.
*H04L 29/06* (2006.01)
*G06F 16/178* (2019.01)
*G06F 16/176* (2019.01)
*G06F 40/166* (2020.01)
*G06F 40/197* (2020.01)

(52) U.S. Cl.
CPC ........ *G06F 16/1774* (2019.01); *G06F 40/166* (2020.01); *G06F 40/197* (2020.01); *H04L 65/403* (2013.01)

(56) References Cited

U.S. PATENT DOCUMENTS

| | | | |
|---|---|---|---|
| 6,477,545 | B1 | 11/2002 | LaRue |
| 7,792,788 | B2 | 9/2010 | Melmon et al. |
| 8,595,202 | B2 | 11/2013 | Lo et al. |
| 8,712,893 | B1 | 4/2014 | Brandmaier |
| 8,738,706 | B1 | 5/2014 | Grieve et al. |
| 8,806,320 | B1 | 8/2014 | Abdo |
| 10,171,581 | B2 | 1/2019 | Nelson et al. |
| 2003/0093694 | A1 | 5/2003 | Medvinsky et al. |
| 2005/0216522 | A1 | 9/2005 | Gomes et al. |
| 2009/0094242 | A1 | 4/2009 | Lo et al. |
| 2009/0292716 | A1* | 11/2009 | Oliver ............ G06F 16/367 |
| 2010/0208064 | A1* | 8/2010 | Liu ............ G08B 13/19667 348/143 |
| 2011/0078246 | A1 | 3/2011 | Dittmer-Roche |
| 2014/0090084 | A1* | 3/2014 | Goodinson ........ G06Q 10/101 726/28 |
| 2015/0339301 | A1 | 11/2015 | Paalborg et al. |

OTHER PUBLICATIONS

Citro, et al., "Conflict Management for Real-Time Collaborative Editing in Mobile Replicated Architectures", In Proceedings of the thirtieth Australasian conference on Computer science, vol. 62, Jan. 30, 2007, pp. 115-124.

Feldman, et al., "SPORC: Group Collaboration using Untrusted Cloud Resources", In Proceedings of the 9th USENIX conference on Operating systems design and implementation, Oct. 4, 2010, 14 pages.

Fraser, Neil, "Differential Synchronization", In Proceedings of the 9th ACM symposium on Document engineering, Sep. 16, 2009, pp. 13-20.

Ignat, et al. "Customizable Collaborative Editor Relying on treeOPT Algorithm", In Proceedings of the Eighth European Conference on Computer Supported Cooperative Work, Sep. 14, 2003, 5 pages.

Ignat, et al., "Tree-Based Model Algorithm for Maintaining Consistency in Real-Time Collaborative Editing Systems", In Proceedings of Fourth International Workshop on Collaborative Editing, Nov. 16, 2002, 8 pages.

Li, et al., "A Lightweight Operational Transformation Approach", Retrieved on: Nov. 9, 2015 Available at: http://citeseerx.ist.psu.edu/viewdoc/download?doi=10.1.1.117.7078&rep=rep1&type=pdf.

Sun, Chengzheng, "A Framework for Undoing Actions in Collaborative Systems", In Journal of ACM Transactions on Computer-Human Interaction, vol. 1, Issue 4, Dec. 1994, pp. 295-330.

Sun, Chengzheng, "Optional and Responsive Fine-Grain Locking in Internet-Based Collaborative Systems", In Journal of IEEE Transactions on Parallel and Distributed Systems, vol. 13, Issue 9, Sep. 2002, pp. 994-1008.

Sun, et al., "Context-Based Operational Transformation in Distributed Collaborative Editing Systems", In Proceedings of IEEE Transactions on Parallel and Distributed Systems, vol. 20, Issue 10, Oct. 2009, pp. 1454-1470.

Sun, et al., "Optional Locking Integrated with Operational Transformation in Distributed Real-Time-Group Editors", In Proceedings of ACM 18th Symposium on Principles of Distributed Computing, May 4, 1999, pp. 43-52.

Xue, et al., "An Integrated Post-Locking, Multi-Versioning, and Transformation Scheme for Consistency Maintenance in Real-Time Group Editors", In Proceedings of 5th International Symposium on Autonomous Decentralized Systems , Mar. 26, 2001, pp. 57-64.

PCT International Preliminary Report on Patentability Issued in PCT Application No. PCT/US2015/65367, dated Mar. 10, 2017, 8 Pages.

PCT International Search Report and Written Opinion Issued in PCT Application No. PCT/US2015/65367, dated May 11, 2016, 12 Pages.

PCT Second Written Opinion Issued in PCT Application No. PCT/US2015/65367, dated Nov. 22, 2016, 9 Pages.

"First Office Action and Search Report Issued in Chinese Patent Application No. 201580067064.6", dated Apr. 3, 2020, 13 Pages.

* cited by examiner

Operational Transformation

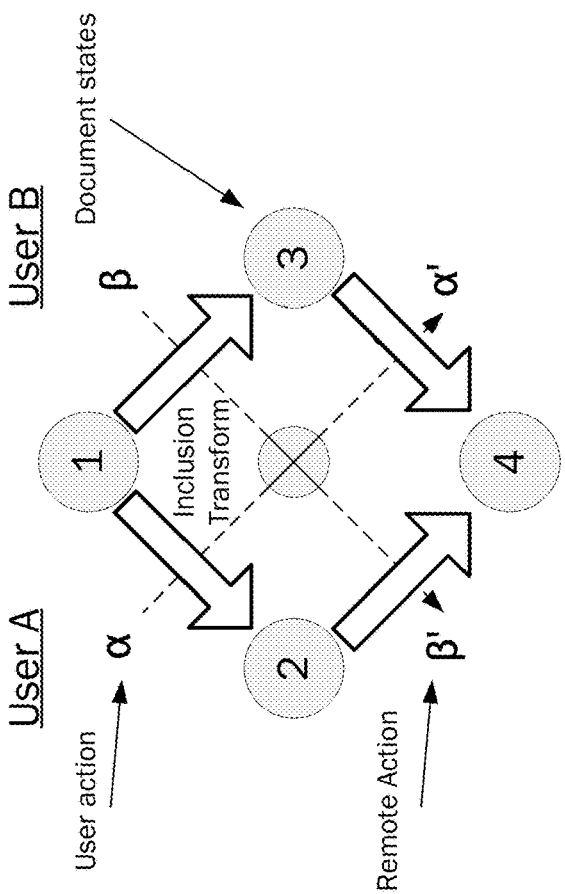

User A — User action α
User B — Document states
Remote Action β'
Inclusion Transform Consistency Property (CP1):
If α' = IT(α, β)
    β' = IT(β, α)
Then
    α + β' = β + α'

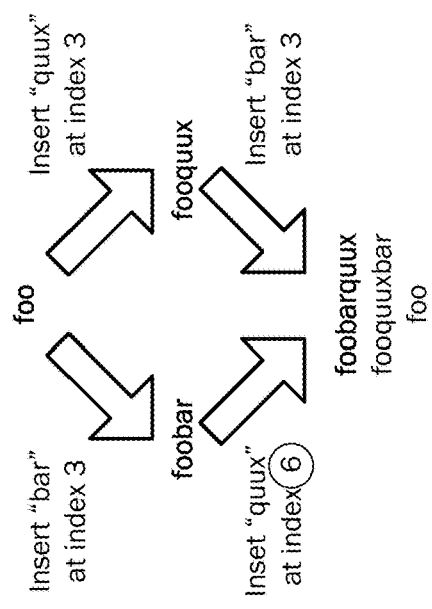

Insert "bar" at index 3
foo → foobar
Insert "quux" at index 3
foo → fooquux
Insert "quux" at index ⑥
foobar → foobarquux
Insert "bar" at index 3
fooquux → fooquuxbar
foo

Inclusion Transform (IT):
α' = IT(α, β) is the inclusion transform of α with β.

α' is an operation that will have the same effect as α on a document where β has already been applied

FIG. 3

Operation Context

Each operation is implicitly associated with a document state to which it applies.
The Inclusion Transform produces a new operation with the same effect, but associated with a different document state.

$$\overset{②}{\beta'} = \overset{①\;+\alpha}{\beta'} = IT(\overset{①}{\beta}, \overset{①}{\alpha})$$

New context "includes" the effect of $\alpha$

Contexts must match

FIG. 4

BLENDED OPERATIONAL TRANSFORMATION FOR MULTI-USER COLLABORATIVE APPLICATIONS

RELATED APPLICATIONS

This application is a continuation of U.S. patent application Ser. No. 14/966,216, filed Dec. 11, 2015, now U.S. Pat. No. 10,171,581, which claims priority from U.S. Provisional Patent Application No. 62/090,621 titled, "BLENDED OPERATIONAL TRANSFORMATION FOR MULTI-USER COLLABORATIVE APPLICATIONS" and having a filing date of Dec. 11, 2014, which is incorporated herein by reference.

BACKGROUND

Operational transformation (OT) allows the creation of collaborative applications that can synchronize changes from multiple users to a shared document or system state. The difficulty of implementing OT systems has slowed the adaptation of computer applications to collaborative use. There exists a need for a "blended" OT that allows for graceful degradation from full OT to less sophisticated/desirable forms of concurrency at the discretion of the developer.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Multi-user collaborative software applications may synchronize data between multiple users or multiple devices. There are multiple existing ways to synchronize data. Some of these synchronization methods, such as file locking, are easy to implement but have performance or functionality drawbacks. Operational transformation (OT) is a high performance synchronization method, but difficult and time-consuming to implement in many cases, and cannot be partially implemented throughout a system. Aspects of the present disclosure describe methods and systems for blending operational transformation with other synchronization methods in the same collaborative software application, allowing operational transformation to be used in situations where it cannot be implemented throughout a system. Throughout this disclosure, such implementations may be referred to as "blended operational transformations."

The details of one or more aspects are set forth in the accompanying drawings and description below. Other features and advantages will be apparent from a reading of the following detailed description and a review of the associated drawings.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout several views.

FIG. 3 illustrates aspects of applying multiple operations according to aspects of the present disclosure.

FIG. 4 illustrates application of the convergence property during transformations.

DETAILED DESCRIPTION

Figure 1:
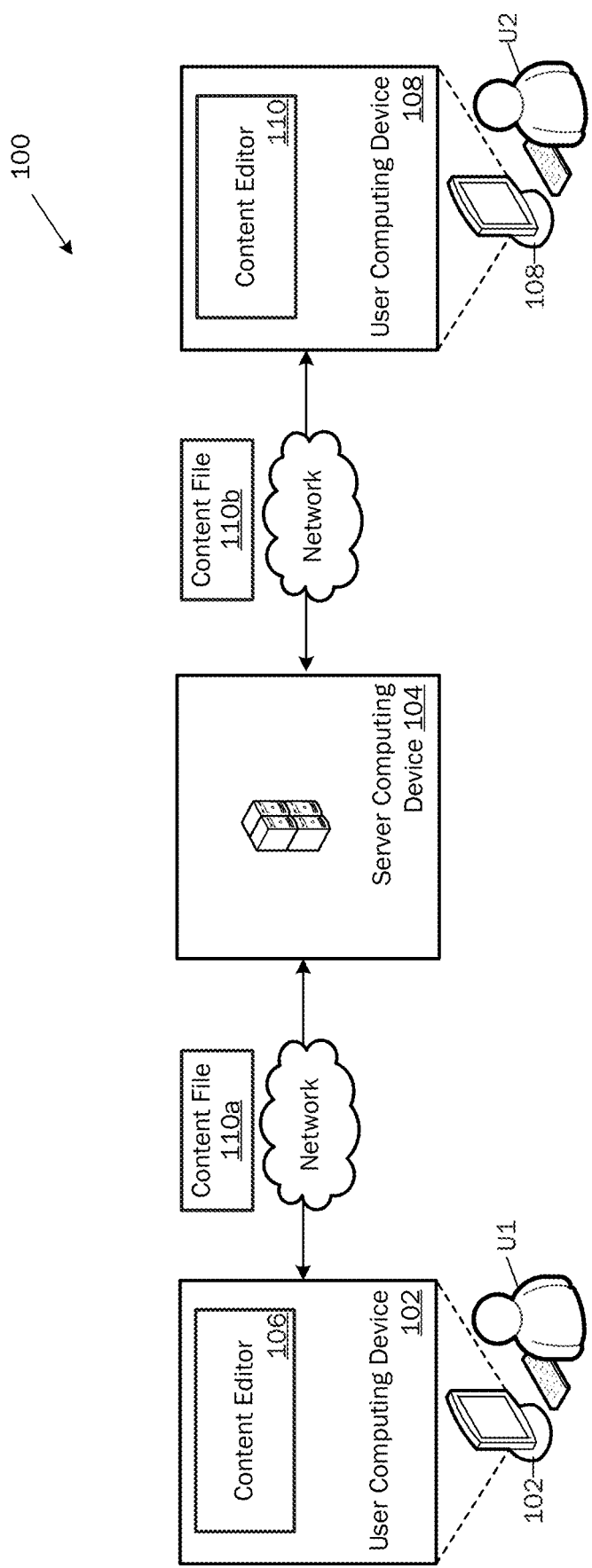
FIG. 1 is a block diagram illustrating a system for collaborative editing.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is non-limiting, and instead, the proper scope is defined by the appended claims. Examples may take the form of a hardware implementation, or an entirely software implementation, or an implementation combining software and hardware aspects. The following detailed description is, therefore, not to be taken in a limiting sense.

Blended OT allows for graceful degradation from full OT to less sophisticated/desirable forms of concurrency at the discretion of the developer. The strategy allows for incremental improvement as the implementation becomes more sophisticated. These improvements can be driven by user, business, or technical priorities. Blended OT may be implemented by content editing programs that allow for collaborative use.

One existing concurrency strategy is "lock/edit/unlock". This strategy is easy to implement, but results in poor concurrency. For example, one user may hold onto the lock for too long, blocking other users even if they wish to edit different parts of the shared state or document in ways that are logically independent of one another.

A second concurrency strategy is "update/edit/commit." This strategy has good concurrency performance when users are working on different areas, but requires a three-way merge if any changes have been made by other users. If other users make rapid changes, this strategy can live-lock. In live-lock, a user can never commit changes because there are always incoming changes waiting to be merged.

Finally, the OT concurrency strategy has fine-grained concurrency and good performance even when users' edits affect each other, but implementation may be difficult. It is particularly difficult to retrofit into existing applications and usually requires a full implementation for all types of edits.

Notably, different types of edits may, in content editing programs and different parts of the documents themselves, require different levels of concurrency: 1) Edits that have full OT support and fast, fine-grained concurrency (e.g., creating, deleting, and moving objects; editing text); 2) Edits where it is difficult or impossible for the OT system to determine the change that the user made, but where it is known that a change has occurred in a particular area (e.g., editing an embedded object defined by a third-party; editing an object as-yet unknown to the OT system); 3) Edits that make sweeping changes to the document, but do not necessarily expose what or where to the OT system (e.g., changing the color scheme, theme, page size, template or slide master); and 4) Edits where the OT system does not know whether something has changed, and cannot tell what has changed by examining the document. These edits are completely opaque to the system.

All except the first type of edit present significant hurdles for a pure OT approach. Many of the more difficult types of edits to handle do not actually require full concurrency or are inherently orthogonal (or nearly so) to other, finer-grained edits. For type (1) edits, where the operations and their transformations are well understood, the blended approach uses full OT. It is desirable to have as much of the user interaction as possible be of this type. Aspects of the present disclosure provide for a blended OT approach with these goals in mind.

For type (2) edits, aspects of the blended OT approach package an opaque representation of the changes as an opaque operation. The originating client may send the operation metadata and data to a server, not necessarily at the same time. Other clients and the server may receive the metadata quickly and optionally lock-out the other users from making further changes (e.g., with a progress bar over the affected area). Other users then receive the data as it becomes available. Once all the data has been received, the operation can finally be applied completely and the lock-out released. If it becomes clear that the data will never become available (e.g., because the originating user disconnected prematurely), then the operation is undone (via an OT undo mechanism) and the lock-out released.

In certain aspects, an opaque representation of the change (for example, a binary blob) can be created. In aspects, such an opaque operation can be applied regardless of the actual state of the affected part of the document. For example, if the opaque operation modified the state of an embedded object defined by a third party, the operation would require that the object exist and be in the expected place, but not that the object is in a particular state. This allows two opaque operations on the same part of the document to transform naively past one another by simply replacing the opaque representation.

The opaque operation is similar to an update/edit/commit model in that the three-way merge always replaces the current state with the incoming state. The replaced state is not necessarily lost, but can remain in the document history if it needs to be recovered. This frees the developer from implementing full OT for a difficult object, and the degraded concurrency is confined to the opaque part of the document.

In aspects of the present disclosure, a binary-synchronization (binary-sync) operation may be employed for type (3) and (4) edits. The entire document may be first scanned for changes and any resulting operations may be sent to the server. In this scenario, there still may be changes that are not comprehended by the OT system. This is particularly likely when making incremental improvements to an OT implementation or when retrofitting OT into an existing application. To properly replicate those opaque changes, aspects of the blended OT approach treat the entire document representation as an opaque blob. Because that blob cannot generally transform past other operations, and because the merge scheme used with other opaque operations would risk replacing too much of the user's work (possibly the whole document), the blob must represent only changes that cannot otherwise be represented by other existing operations, and its operation context must be a version known by the server and other users. To transmit and apply such an operation, a more specialized approach, here called a "binary-sync" operation, is used.

In aspects, the binary-sync can be processed either in the operation stream or on a side-channel. For simplicity, only one binary-sync may be pending at a time. Clients that wish to submit a binary sync while another is pending may be rejected by the server. Such clients can instead add their opaque blob to the document history as a replaced state. A client cannot submit a binary-sync unless it certifies that its changes are based off of the server's most recently completed binary-sync.

Upon receiving a request to submit a binary-sync, the server first conditionally accepts the binary-sync, locking out other binary-sync attempts while it receives the data from the submitting client. As an optimization, the server may optionally begin streaming the data to other clients in anticipation of accepting the binary-sync. If the server fails to receive the data correctly (e.g., because of a network failure), it aborts the binary-sync and releases the lock on other binary-sync attempts. Once the server has all the data, it completes the binary-sync and signals other clients to resynchronize.

Other clients may resynchronize by first getting the opaque blob from the server. Because of the time required to transfer the opaque blob, other operations may have been applied to the document states of the clients. The receiving clients initialize a background copy of the document state from the opaque blob and apply the newer operations to it. Because applying those operations may take various amounts of time, clients repeatedly check for unapplied operations and apply them to the background document until it is in the last-known state of the server.

At this point, the only differences between the background copy and the active copy being edited by the user are opaque changes and any changes recently made by the user, but not yet accepted by the server. The receiving clients now copy the user's most recent operations from the active document to the background document. Finally, with the only differences between the active document and the background document being the hidden, opaque changes that were intended to be transmitted or replaced, the receiving clients swap the active and background documents. At the end of the process, all users are editing a version of the document with the changes that were otherwise hidden to the OT system.

FIG. 1 is a block diagram illustrating a system for collaborative editing according to aspects of the present disclosure. As illustrated in FIG. 1, the system 100 includes a first user computing device 102 that is operable by a first user U1 and a server computing device 104. The user computing device 102 and the server computing device 104 communicate over a network. The user computing device 102 includes a content editor 106. In the example shown in FIG. 1, a content file 110a may be transmitted to the first user computing device 102 from the server computing device 104.

System 100 may further include a second user computing device 108 that is operable by a second user U2 connected to server computing device 104. The second user computing device 108 and the server computing device 104 communicate over a network. The second user computing device 108 includes a content editor 110. In the example shown in FIG. 1, a content file 110b may be transmitted to the second user computing device 102 from the server computing device 104.

It should be understood that first user U1 and second user U2 may both be using content editors to edit separate versions of the same document. In this case, first user U1 is editing document version 110a while second user U2 is editing document version 110b. Document versions 110a and 110b are versions of the same document. The users are editing the document in a collaborative environment where changes made by both users should be updated to a master version of the document.

System 100 represents a common topology for collaborative interaction with a shared state for users to interact with client software, such as content editors, with changes to the state propagated via a central server, such as server 104 to other users (could be any number of additional users) with other client software, but many other approaches, for example, peer-to-peer interaction, are possible. In some aspects, the content editor, such as content editors 106 and 110 are applications running on the user computing devices that are operable to collaboratively edit content files. Additionally, in some aspects, the content editors interact with the server computing device 104. In some examples, the content editors may be browser applications operable to generate collaborative edits based on content served by a remote computing device such as the server computing device 104 or another computing device. According to an example, an extension is installed on the user computing device as a plug-in or add-on to the browser application (i.e., content editor 106) or is embedded in the browser application.

In an example, the content editor is a collaborative document editor such as the WORD document editor from Microsoft Corporation of Redmond, Wash. or a spreadsheet editor such as the EXCEL® spreadsheet editor also from Microsoft Corporation. Similar non-limiting example content editors may include the POWERPOINT® presentation graphics program from Microsoft Corporation of Redmond, Wash.

Figure 2:
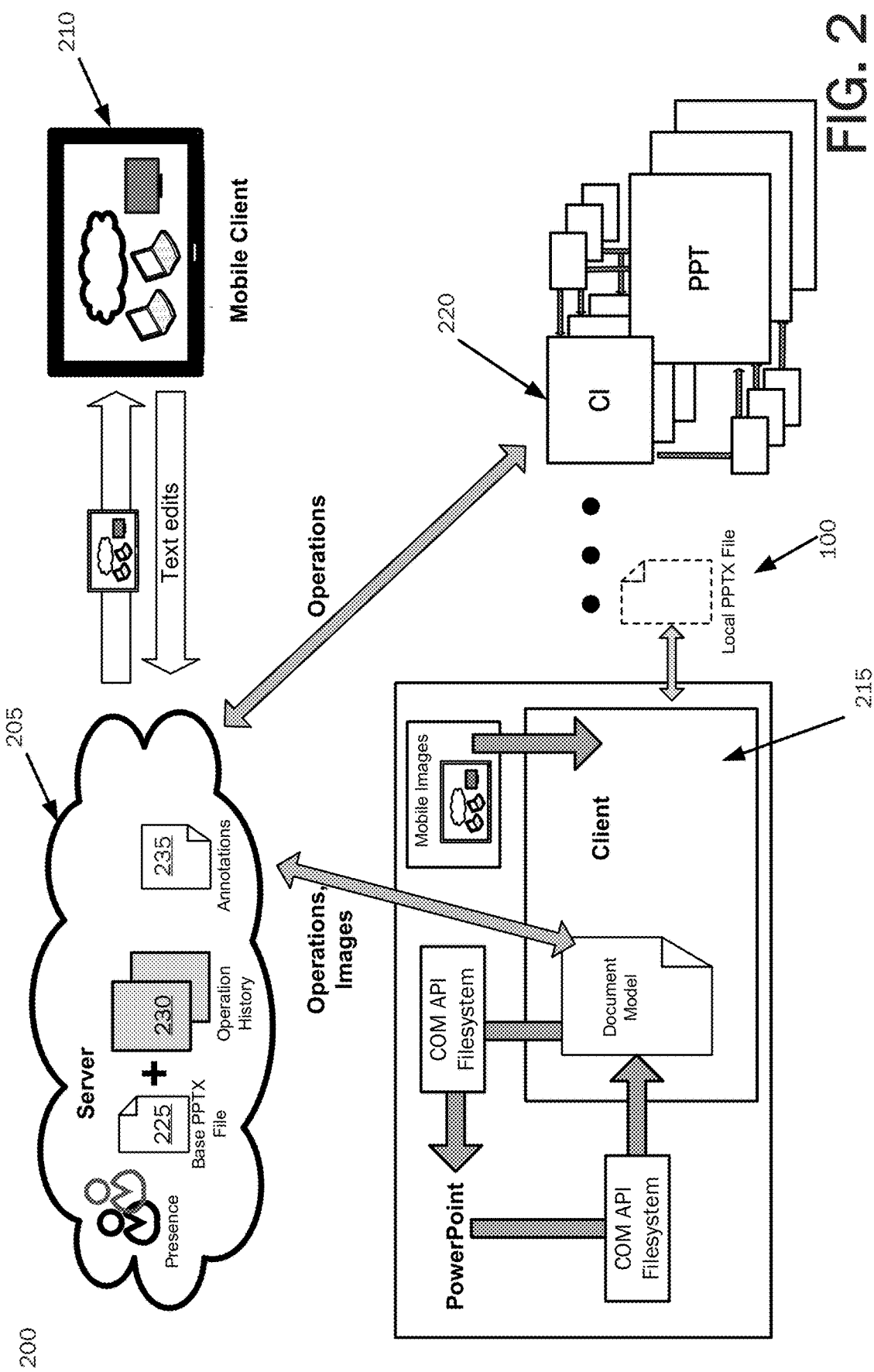
FIG. 2 is a block diagram illustrating an operating environment for collaborative editing.

FIG. 2 is a detailed block diagram of one example of a system 200 for propagating changes from one document to another. System 200 may contain a server 205 in communication with a number of clients, such as mobile client 210, first client 215, and second client 220. The server 205 may maintain a base document, such as an example base PowerPoint file 225. The base PowerPoint file 225 may be a file which each of mobile client 210, first client 215, and second client 220 are collaborating on and providing edits to the server 205. The server 205 maintains an operation history 230. Operation history 230 may comprise a record of each operational change sent for base PowerPoint file 225 and server 205. Server 205 may also maintain a list of annotations 235 for base PowerPoint file 225.

In an example operation in system 200, mobile client 210 may provide text edits to the base PowerPoint file 225. In aspects of the present disclosure, such text edits may be handled with full OT support. Client 220 may provide changes to the base PowerPoint file 225 that are transferred to server 205 using aspects of the blended OT approach package providing an opaque representation of the changes as opaque operations. Client 215 may provide changes to the base PowerPoint file 225 including both opaque operations and image changes that may be transferred via a binary sync.

The user computing device 102, the server computing device 104, the server 205, the mobile client 210, the first client 215, and the second client 220 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

FIG. 3 illustrates aspects of applying multiple operations according to aspects of the present disclosure. A base document (version 1) may contain the text phrase "foo." User A and user B may both be collaborating on editing this base document. User A may attempt to insert the text "bar" at index position 3 of the base document. Similarly, user B may attempt to insert the text "quux" at index position 3. The edit by user A may result in a document version 2 containing the text "foobar." The edit by user B may result in a document version 3 containing the text "fooquux." The OT system thus needs to employ an inclusion transform to the document versions to create a document version 4 which properly contains both textual edits. The document version 4 should contain a final text result of "foobarquux." In some aspects, the results may also be "fooquuxbar," "foo," or simply and empty string. Each of these results may still satisfy the consistency property. A drafter of the transformation may determine which result is desired.

The inclusion transform (IT) applied states that $\alpha'=IT(\alpha, \beta)$. This is the inclusion transform of the first user action $\alpha$ with second user action $\beta$. In other words, $\alpha'$ is an operation that will have the same effect as $\alpha$ on a document where $\beta$ has already been applied. This follows the consistency property which states: if $\alpha'=IT(\alpha,\beta)$ and $\beta'=IT(\beta,\alpha)$ then $\alpha+\beta'=\beta+\alpha'$.

FIG. 4 illustrates application of the convergence property during transformations. Each change operation may be implicitly associated with a document state to which it applies. The IT may produce a new operation with the same effect, but the new operation may be associated with a different document state. In other words, $\beta'^2=\beta'^{1+\alpha}=IT(\beta^1, \alpha^1)$ such that the new context includes the effect of a and such that the contexts of the user actions in the IT are the same. Where the superscripts here explicitly indicate the context (the document state to which the operation applies).

Document context is omitted from other equations for ease of notation and can be inferred.

Collaborative use involves propagating changes that one user makes to another user's document and vice versa at the same time or at substantially the same time. Collaborative use may be particularly well suited for real time if you can reduce the size of the collaboration messages that you send over the network. It may be advantageous to send individual change operations (insert a character at this position, insert a slide, move a shape, etc.) as opposed to sending the entire document and then performing a three-way merge on the client.

The individual change operations may be sent over the network to apply them on the other side to the other user's document. If a character needs to be inserted at a particular location (e.g., position three) it might not be position three anymore on the other side due to the other user typing something before the change operation that causes the insertion to be at position 12. In another example, one user may attempt to edit a shape and the shape has been deleted in the other user's document. Operational transformation is used to transform those operations such that they can be applied correctly on a remote user's documents.

In aspects, each operation may have an implicit context within the document to which it is meant to be applied. The transformations change the logical document to which that operation applies from the source document to the user's other document. How to write the transformations can be a difficult problem as each operation has to be able to transform against each other operation pair-wise. Accordingly, a large front-end effort may be required to ensure that all of those transforms exist and function correctly and meet all the properties or documents.

Aspects of the present disclosure do not implement the full OT system, while getting the benefits of OT. This may be achieved by defining changes such that certain operations (such as text-based change operations) have very high performance for the user.

More difficult change operations may then be handled with a lower performance system. Aspects of the present disclosure may create wholesale objects to send over the network representing the more complex change operations. While the benefit of small network packets may be lost, the change operations may be excluded from the transform matrix and are sent as an opaque object. In other words, the blended OT blends rich objects with transformations and opaque objects. To avoid conflicts between two users' changes, real time change presence notification may be employed to alert the two users that they are about to have competing edits. Alternatively, the fact that users tend not to edit those objects at the same time may be used to avoid conflict.

If a particular change that the user is making for which it is uncertain that the change does not affect the rest of the document, aspects of blended OT employ a binary sync. For example, changing the document theme may cause a sweeping change that affects many objects throughout the document. It may prove inefficient to determine each change that will occur in the document. As such, OT operations may be generated only for changes that already have associated change operations. Other, more complex, changes may not have associated change operations. This other section of changes may be invisible to the OT system.

These "invisible" changes may be sent to the server at a slower cadence. In some aspects, the document may be saved first. Then the whole document may be sent over the network to the other user. As this process takes time, there is reliance on the fact that the changes that are contained within that document are invisible to the OT system. Meanwhile, the changes that were visible are already part of the OT system because operations were previously generated for them.

When that document arrives on the other side, the document may have advanced to a version beyond the document containing the invisible changes. For example, the change document may have been generated at version 25, but once it has arrived at the other user, that user may have advanced to version 60. This may result in tens of operations that are in the user's current document that are not in the incoming change document. Thus, the change document must be brought as close as possible up to the current revision by applying OT operations to it.

To apply the operations to the document, the document may be opened in the background. Once the document reaches a state where the current user is, the only thing in the current user's document that is not in the background document is whatever the user has done just now, specifically changes for which no operations have yet been created. In some aspects, the user may be locked out for a brief period of time to copy those most recent changes to the background document. The documents may then be switched over without the user noticing or substantially without the user noticing. And now all of those changes which were otherwise invisible to the OT system will appear for that second or third user.

In some aspects of the present disclosure, multiple users may attempt binary syncs at the same time. For example, if a first binary sync containing a theme change made it to the server first, the server would then reject the second user's binary sync containing a page layout change. This clashing may be mitigated through policies and status indicators. For example, when the first binary sync was in transit, a notification may appear for each user that indicates that the user should wait until completion of the first binary sync before making a second sweeping change. In alternate aspects, policies may be in place to send binary syncs periodically at some cadence. Also, binary syncs may be triggered when it may be detected that the user had changed the document and there was some possibility that they had included changes invisible to the OT system. For example, a user using a drop down menu that includes functions for global changes may serve as a trigger that a binary sync may be triggered sooner rather than later to minimize the time between when such a change is made before another user sees it.

In aspects of the present disclosure, a first flow of changes from a user to a server is established. In some aspects, the server may be representative of all other users working on a same document. In some aspects, the flow may be a peer to peer process with no server involved.

A first user may be making changes to the document. These changes may then be sent to the server via the first flow. Subsequently, other users and also the system are receiving changes made by other users through the server that must be implemented into the document. As those operations pass each other they have to be transformed or in the case of an opaque operation one operation will have priority over another. In that case, an OT operation may be implemented which represents that opaque state change and the transform results in simply dropping one state or the other.

In the case of opaque objects, it needs to be determined whether a user has finished making a particular change. For example, a user may indicate to the system that changes to a particular object are complete. The indication may be an explicit indication (such as saving the document version) or an inferred indication based on a system policy. Non-limiting examples of inferred indications may include when a user typically makes a key stroke at a certain frequency and suddenly stops. Another non-limiting example may be when a user changes slides in content editing software such as POWERPOINT®. Once this indication is made, the system may begin propagating the changes to a server.

A representation of the changes may then be collected. For example, the changed part of the document may be serialized to a disk. Alternatively, change objects may be determined at a shape level where certain shapes like a picture or a video or a sound or a smart-art graphic would be saved as a change object.

Next, the system may determine whether or not a change had actually been made. With certain opaque objects, it may be known that the user was there and they were clicking around, but it may not be known whether a substantive change was actually made. This process may serve to prevent sending unnecessary packets over the network. For example, a binary comparison may be made with a previous state. Also, generated states may be opened and various parts of them may be compared with previous states.

The changes may be packaged as an operation in the OT system. The operation may serve to package the state with an identifier for where to incorporate the change when it gets to the other side. The operation may further contain transforms to determine actions if the object to be changed had been subsequently deleted or a priority for conflicting changes. Operations may further contain timestamp information to assist with resolving conflicts. In some aspects of the present disclosure, conflicts may be resolved based on a priority level of the authors of the respective conflicting changes.

The packaged operation is sent over the network to the server and the other users. As the packaged operation traverses the network and goes through a server and potentially intermediate nodes, and arrives at other clients (users), the server may perform certain transformations.

The packaged operation may then be applied at the other client. Using client OT control algorithms, the packaged operation may be transformed to be ready to be applied to the document. In some aspects, the packaged operation may get dropped due to being lost in one of these transformations. In another aspect, the place the packaged operation was meant to be applied may have been deleted, in which case there is nothing to do, and it gets dropped. However, the location may have simply moved, and transformations may be applied to ensure that the packaged operation is applied in the right place. Again, if two users attempt to change the same object, one of the change operations may be dropped.

Once the packaged operation is ready to be applied in the correct object location, that object may be deserialized. In other words, the object becomes a real object from its serialized state. In some aspects, that may involve opening the serialized object state in the background and copying it into the existing presentation in the right place. If the object is an image, the insert image APIs may be used to implement size and position adjustments. Once the change is implemented, the object may appear in the user's document. If there was another object there, the previous object may be deleted or replaced.

If another user is attempting to edit the same object being replaced by the change operation, the object may simply be deleted out from under them. In some aspects of the present disclosure, the user may be warned that there is an incoming destructive edit to an object. This may provide the user with an opportunity either to save a copy of that object, or to reject that incoming change and resend their changed object to everyone else as the new version.

In aspects of the present disclosure, it may be determined that a binary sync needs to be sent to the server. For example, a user may actually click to initiate the binary sync. For example, changes to animations in a content editing program may trigger a binary sync to be sent as it may be assumed that multiple users are probably not editing animations at the same time as compared to making text changes. Accordingly, if a user opened an animation pane, then the first couple of times that the pane is opened a notification may be presented to the user indicating that such changes may not be supported in real time. The user may be directed to click the synchronize button or the user can wait for a next scheduled synchronization. In some aspects, each time the user opens an animation pane, a synchronize button may be indicated, for example, with a color (red), until a binary sync is sent.

Alternatively, binary syncs may be sent based on a system timer. There may be a predefined minimum time that elapses between binary syncs to avoid sending the syncs too quickly. There may also be employed a predetermined maximum time interval after which a binary sync will be transmitted regardless of whether an indication was received that such a binary sync was needed. Such a time interval may start upon a user opening a document and actually interacting with the open document. Also, if a user received a binary sync, the time interval may not start again until the user again interacted with the document.

In the case that a user was unable to open a document correctly because of corruption, an emergency binary sync may be employed where the client in distress would complain to the server. The server may respond by asking all connected clients to send the user a binary sync that could allow the user to open the document directly and try to recover their state.

Figure 5:
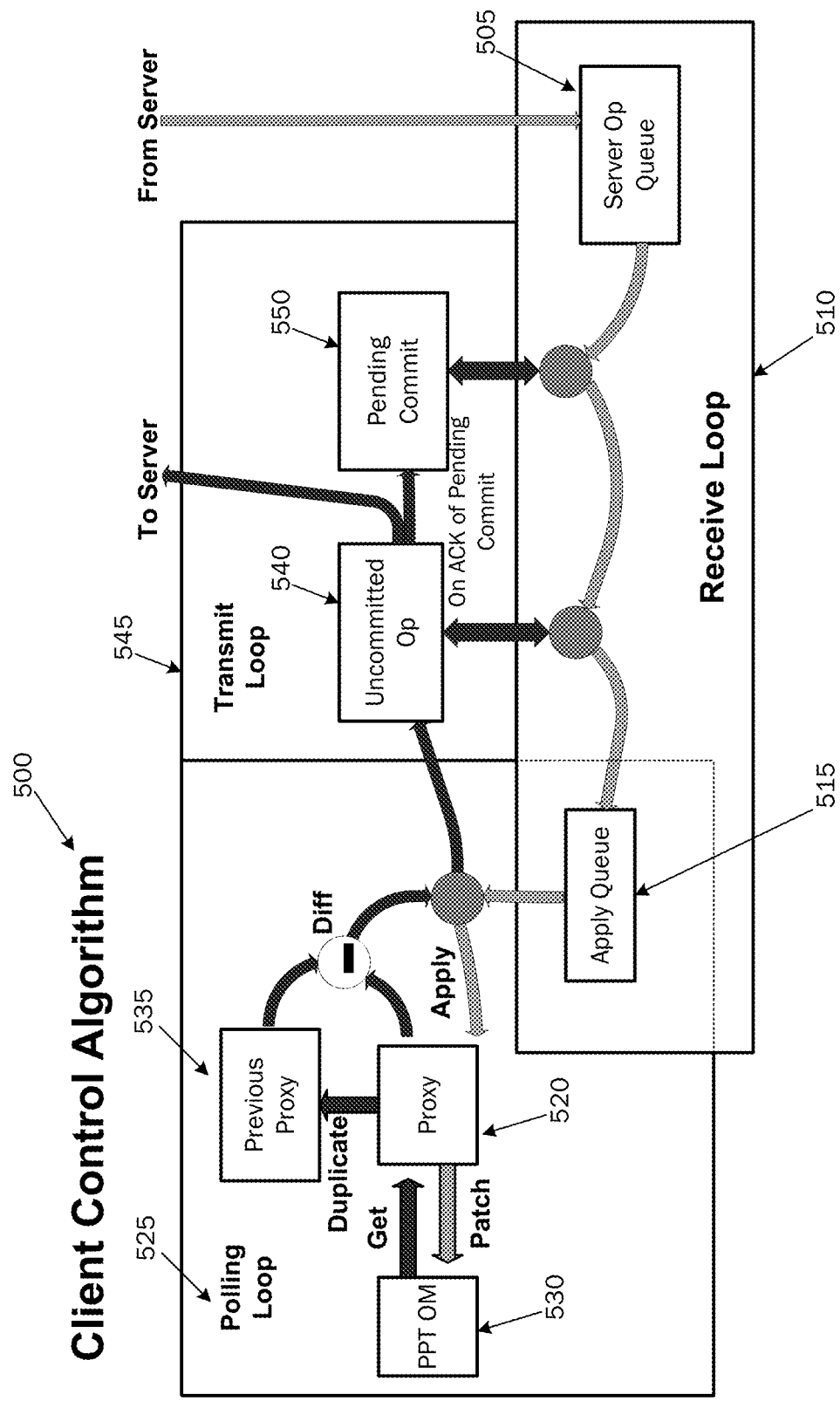
FIG. 5 illustrates in further detail how queues may be implemented by a client control algorithm in aspects of the present disclosure.

FIG. 5 illustrates in further detail how the queues may be implemented in aspects of a client control algorithm 500 in a blended OT system. Operations may be received from a server to a sever operation queue 505 as part of a receive loop 510. After having decided to send a binary sync, a control algorithm may update queues of incoming and outgoing operations. The control algorithm may keep track of what versions each operation applies to and whether those operations need to be transformed. Once users stop editing a document and the queues all drain, then user documents will be in sync and consistent. In other words, operations that the server has accepted and stored to that binary sync to bring it up to the right level are not limited to operations seen by a particular client. That property of the binary sync state may be referred to as being clean. Thus, a clean server approved version of the document may be sent up after the client serializing that state ensures it did not have any unacknowledged generated user operations.

Operations may travel from the sever operation queue 505 to an apply queue 515. The operations may then be applied to a proxy 520 which is part of a polling loop 525. Proxy 520 may provide the operation as a patch function to an application state manager, for example, PowerPoint OM 530.

Next, proxy 520 may use a GET function to access operations from PowerPoint OM 530 to be provided to the server for implementation into a base document. Proxy 520 may be in communication with a previous proxy 535. Comparison of the differences between previous proxy 535 and proxy 520 help inform the client control algorithm 500 as to whether or not there are actual changes to be made to the base document. This process may serve to prevent sending unnecessary packets over the network. For example, a binary comparison may be made with a previous state. Also, generated states may be opened and various parts of them may be compared with previous states.

If there is an actual change to transmit, the operation moves to an uncommitted operation queue 540. The uncommitted operation queue 540 may be part of a transit loop 545. Uncommitted operation queue 540 may wait to receive a commit acknowledgement from pending commit block 550. This provides a superior approach to live-lock, where a user can never commit changes because there are always incoming changes waiting to be merged. Upon receipt of the acknowledgement, a binary sync may be provided back to the server.

As discussed above, when binary sync starts, it could be in one of two modes, explicit and passive. In the explicit mode, the user clicked a button to initiate it and they subsequently wait for the sync to go through. In some aspects, a modal progress object (e.g., bar) may be presented to the user to prevent the user from making further changes to the document to allow the outgoing queue to be drained. During this time, there may be a queue of operations that have been generated. Once the server provides an answer for pending operations, any remaining operations may be sent. This results in a server version number for the document. Subsequently, the state may be saved and sent along. In the explicit case, the user may be locked out while the queues are drained. In the passive case, the queue may be monitored for an opportunistic spot where the outgoing queue was drained. For example, in a brief period of time when a user is not editing a document, the queues may be drained. If too long of a period elapses while waiting for an opportunistic spot, the system may switch to the explicit mode. Here, the user gets locked out with a progress bar while the queues are drained and the state is saved.

Once the state is established, the state may be sent to the server. In some aspects of the present disclosure, two version numbers may be kept along with that state. One version number may be associated with the OT version at which the state was saved. This may represent the version including the last accepted revision of that document. The second version number may be an identifier of the previous binary sync. The document state may then be viewed at as a binary sync plus a list of operations being applied to it. These two version numbers may serve to identify where in the state stream it was. The server may then verify the binary sync was based off of the most recent binary sync that the server knew about. In some aspects, the server may be responsible for ensuring that there was only one binary sync in the stream at a time.

In some aspects, when a message is sent requesting a binary sync, if the lock is in place and permission is granted, the binary sync data would begin sending. If a user went offline in that period of time, then the server may provide a predetermined period of time to come back and then release the lock. In such a case, the binary sync would not go through as the server could not accept the partial data for a binary sync.

The server may also speed up transfer after providing permission to begin a binary sync. In such a case, the server may send a notification out to all other clients warning them that there might be a binary sync in progress assuming the uploading client actually manages to finish uploading. Here, the server may start streaming out the binary sync even though it did not have all of the data yet. The other client would be prefetching all of that binary sync data and then once the uploading client completed successfully, then the server would declare that version as the next binary sync version and broadcast the version out to all clients.

Having described an example architecture and other aspects of the present disclosure above with reference to FIGS. 1-5, FIGS. 6 and 7 are flowcharts showing general stages involved in an example method for method for propagating document changes.

Figure 6:
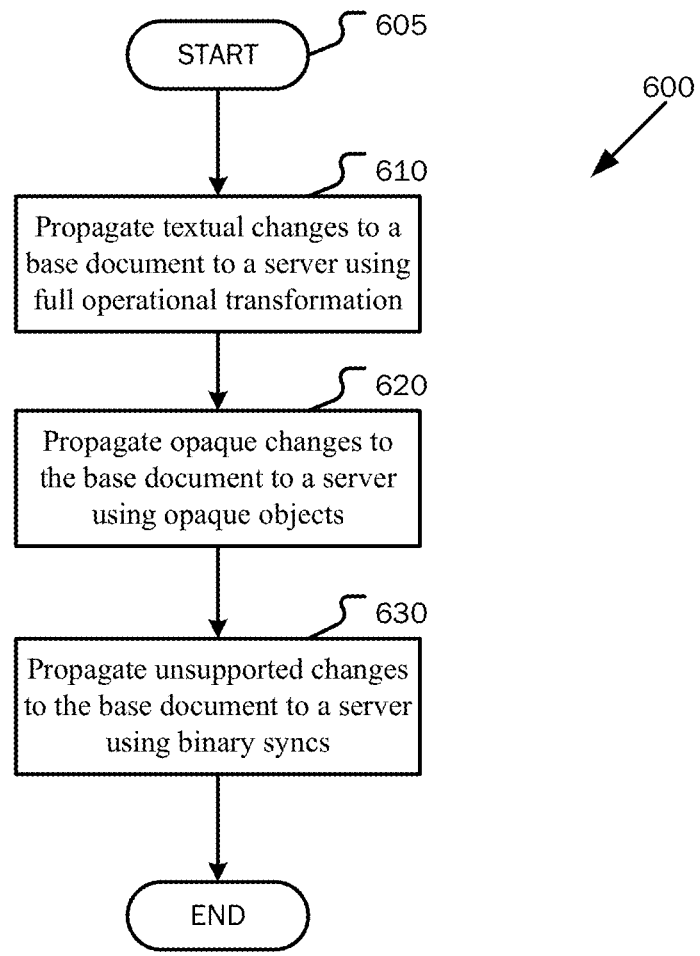
FIG. 6 is a flowchart showing general stages involved in an example method for propagating document changes according to aspects of the present disclosure.

Referring then to FIG. 6, the method 600 begins at start step 605 and proceeds to step 610. At step 610, textual changes to a base document may be propagated to a server using full operational transformation. The server may be in communication with a plurality of users collaborating on the base document. Other changes besides textual changes may also be propagated by using full operational transformation. For example, changes regarding shape attributes and created/deleted slides in the base document may be propagated using full operational transformation.

At step 620, opaque changes to the base document may be propagated to a server using opaque objects. The opaque changes may comprise changes for which no operations exist. In some aspects, the opaque objects may be state based. Certain opaque objects may be representative of a large state. For example, opaque objects that represent a large state may comprise one or more of: a picture, a video, and an embedded Object Linking and Embedding (OLE) object. Such large state opaque objects may be sent out-of-band to the server. In some aspects, a progress bar may be presented to a first user while propagating the opaque changes. In some situations, a conflict may exist between a number of opaque changes. In such scenarios, a priority policy may be referred to determine priority of which change will be implemented in the base document.

At step 630, unsupported changes to the base document may be propagated to a server using binary syncs. In some aspects, the unsupported changes comprise global changes to the base document. In some aspects of the present disclosure, the unsupported changes may comprise theme changes to the base document.

Figure 7:
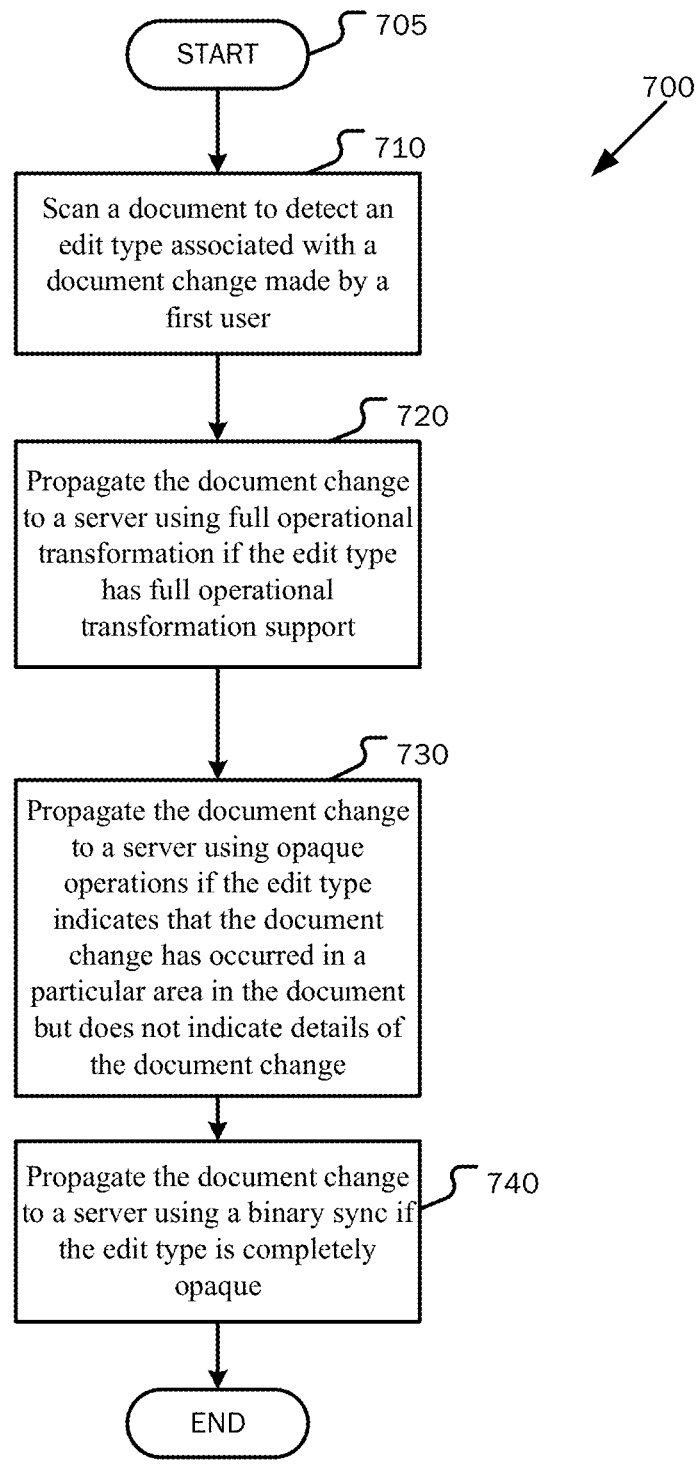
FIG. 7 is a flowchart showing general stages involved in an example method for propagating document changes according to aspects of the present disclosure.

Referring then to FIG. 7, the method 700 begins at start step 705 and proceeds to step 710. At step 710, a document may be scanned to detect an edit type associated with a document change made by a first user in a collaborative environment.

At step 720, the document change may be propagated to a server using full operational transformation if the edit type has full operational transformation support.

At step 730, the document change may be propagated to a server using opaque operations if the edit type indicates that the document change has occurred in a particular area in the document but does not indicate details of the document change. For example, an opaque operation may comprise a binary blob representative of the document change. In aspects of the present disclosure, other users in the collaborative environment may be locked out of the document while the opaque operations are propagated. Furthermore, the opaque operations may be implemented regardless of the state of an affected part of the document.

At step 740, the document change may be propagated to a server using a binary sync if the edit type is completely opaque. In some aspects of the present disclosure, the document change may be propagated to a server using a binary sync if the edit type indicates that the document change affects the entirety of the document. An opaque blob may be created for the binary sync representing only changes that cannot be supported by opaque operations or full operational transformations. In some aspects, other binary syncs may be locked out during the first binary sync.

FIGS. 8-9A and 9B and the associated descriptions provide a discussion of a variety of operating environments in which examples of the present disclosure are practiced. However, the devices and systems illustrated and discussed with respect to FIGS. 8-9A and 9B are for purposes of example and illustration and are not limiting of a vast number of computing device configurations that are used for practicing aspects, described herein.

Figure 8:
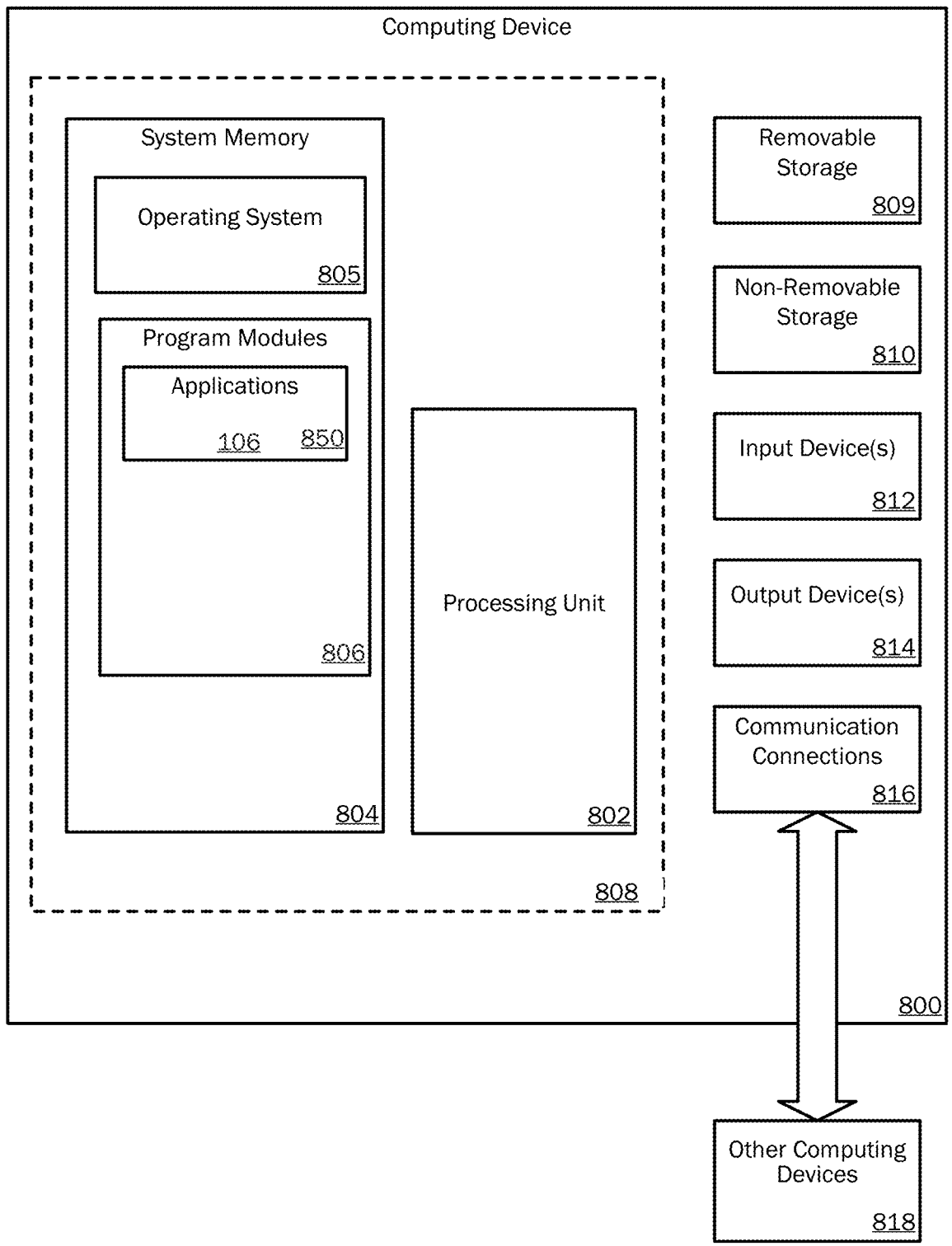
FIG. 8 is a block diagram illustrating one example of the physical components of a computing device.

FIG. 8 is a block diagram illustrating physical components (i.e., hardware) of a computing device 800 with which examples of the present disclosure can be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850 including the content editor 106. According to an aspect, the system memory 804 includes the software for propagating document changes in a collaborative editing system. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., software for propagating document changes in a collaborative editing system) performs processes including, but not limited to, one or more of the stages of the methods 600 and 700 illustrated in FIGS. 6 and 7. According to an aspect, other program modules may be used in accordance with examples of the present disclosure and include applications such as electronic mail and contacts applications, word processing applications, spreadsheet applications, database applications, slide presentation applications, drawing or computer-aided application programs, etc.

Aspects of the present disclosure are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media do not include a carrier wave or other propagated data signal.

According to an aspect, communication media is embodied by computer readable instructions, data structures, program modules, or other data in a modulated data signal, such as a carrier wave or other transport mechanism, and includes any information delivery media or transmission media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 9A:
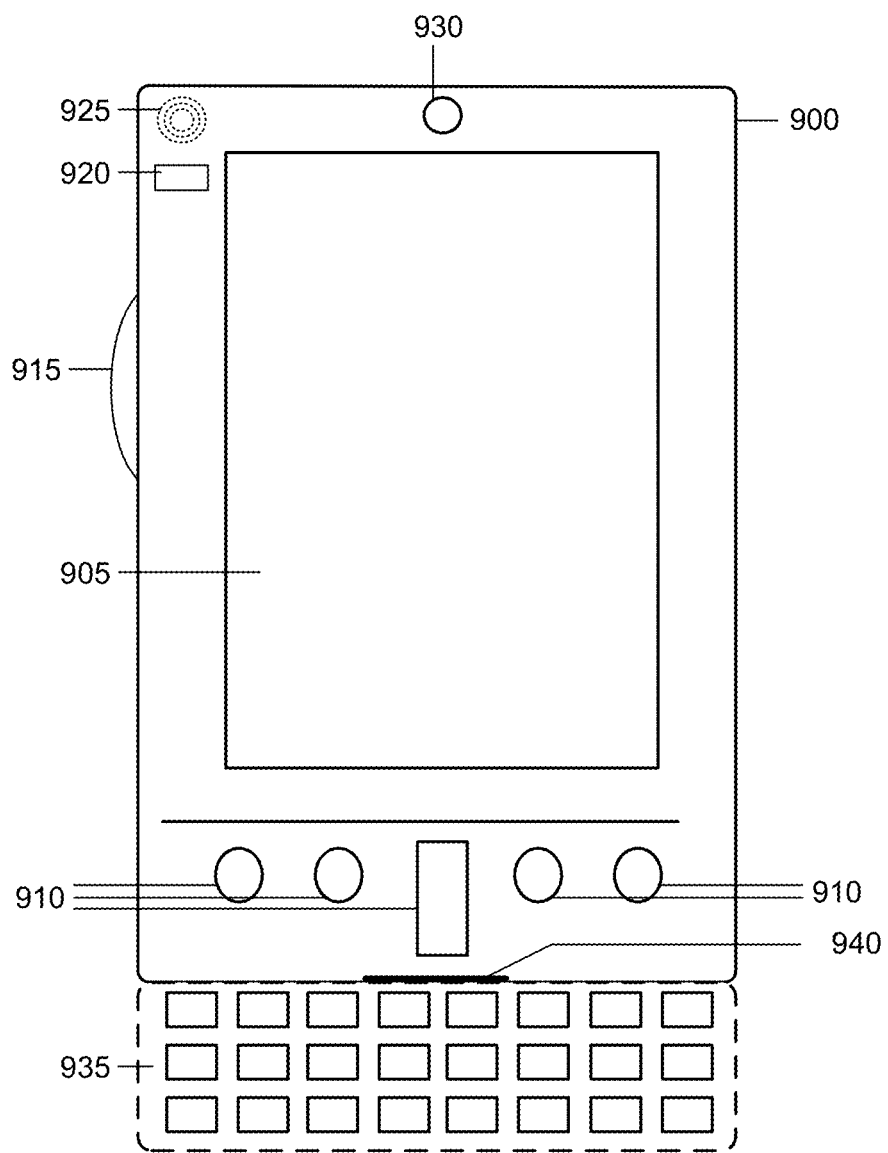
FIGS. 9A and 9B are simplified block diagrams of a mobile computing device.
Figure 9B:
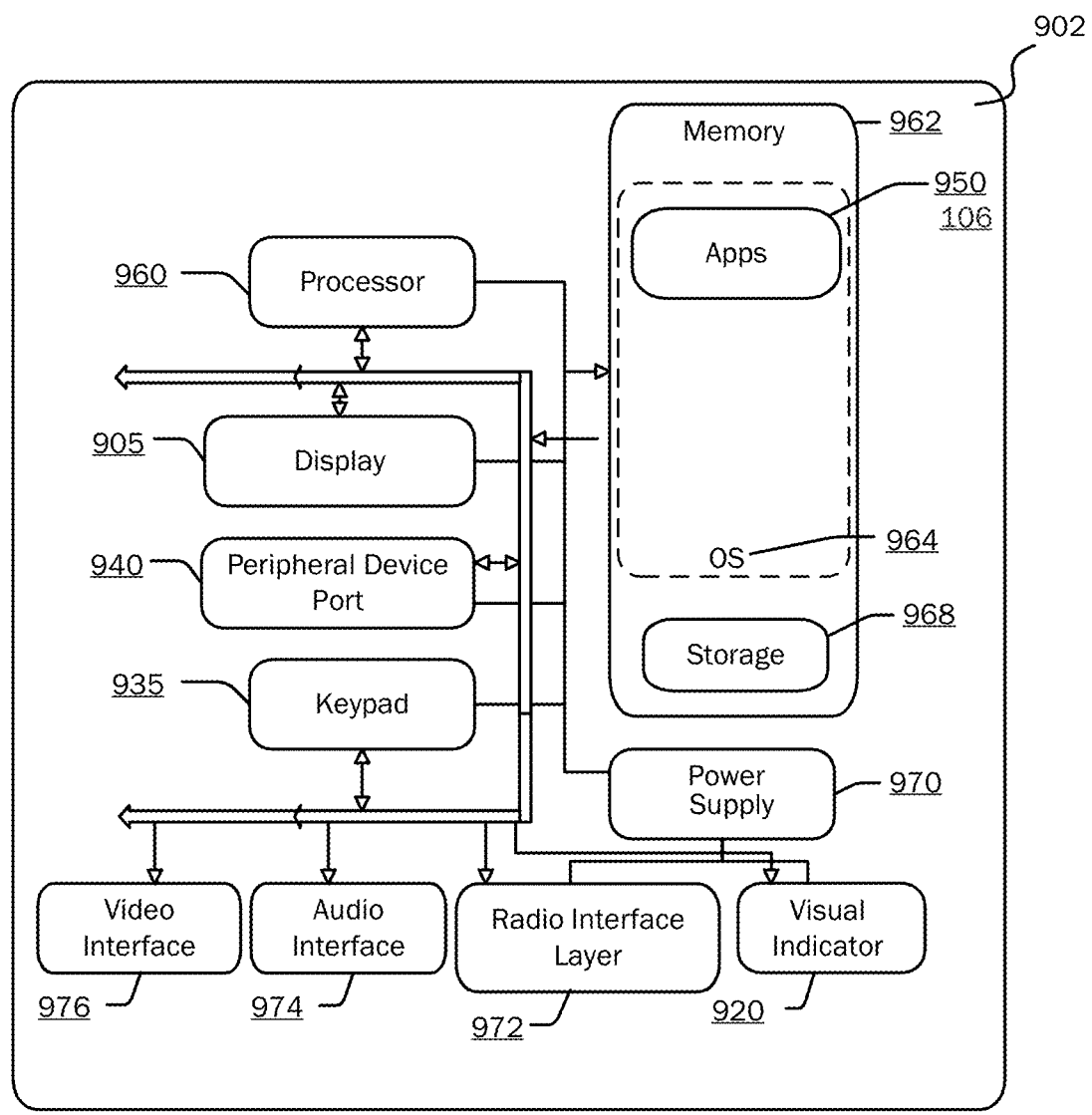

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, the content editor 106, and so forth. According to an aspect, software for propagating document changes in a collaborative editing system is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode claimed. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for propagating document changes made to a document by a plurality of users that are editing the document concurrently, the method comprising:
    synchronizing an active document associated with a base document, the synchronizing including applying a first document change previously made to the base document to the active document, the first document change comprising an operational transformation;
    receiving an instruction to resynchronize the active document with the base document that has been updated with an operation not recognized by an operational transformation system;
    based on receipt of the instruction, retrieving a binary large object representation of the base document updated with the operation;
    based on having made the retrieval, determining that a newer operational transformation, which is recognized by the operational transformation system, has occurred in the base document since the retrieval;
    based on having determined that the newer operational transformation has occurred in the base document since retrieval, initializing a background copy of the retrieved base document from the binary large object representation of the base document and updating the background copy of the base document with the newer operational transformation until the background copy of the base document matches a last known state of the base document; and
    based on the background copy of the base document matching the last known state of the base document, swapping the background copy of the base document for the active document to present a new active document having been updated with the operation not recognized by the operational transformation system and the newer operational transformation.

2. The method of claim 1, wherein the binary large object representation of the base document updated with the operation is not state-based.

3. The method of claim 1, wherein the base document previously received the operation via a side-channel to the base document, wherein the side-channel is a communication stream that is different from an operational communication stream used to transmit changes to the base document.

4. The method of claim 1, wherein the binary large object representation of the base document includes one or more of: a picture, a video or an embedded object linking and embedding (OLE) object.

5. The method of claim 1, wherein the operation comprises a change to a shape attribute.

6. The method of claim 1, further comprising determining that operational transformations in the active document have occurred and are not present in the last known state of the base document; and
    applying the operational transformations in the active document that are not present in the last known state of the base document to the background copy of the base document, and
    wherein swapping the background copy of the base document for the active document presents the new active document having additionally been updated with the operational transformations in the active document that were not present in the last known state of the base document.

7. The method of claim 1, wherein the newer operational transformation, which is recognized by the operational transformation system, comprises creating an object, deleting an object, moving an object or editing text.

8. A system for propagating document changes in a concurrently collaborative environment comprising:
    a plurality of clients configured to concurrently provide changes to a document;
    a server in communication with the configured clients to maintain a base version of the document and an operation history for the base version of the document;
    one or more processors configured to execute instructions stored in a memory, the instructions causing the processor to:
        synchronize an active version of the document with the base version of the document, the synchronization including application of a first document change previously made to the base version of the document to the active version of the document, the first document change comprising an operational transformation;
        receive an instruction to resynchronize the active version of the document with the base version of the document that has been updated with an operation not recognized by an operational transformation system;
        based on receipt of the instruction, retrieve a binary large object representation of the base document updated with the operation;
        based on having made the retrieval, determine that a newer operational transformation has occurred in the base version of the document since the retrieval;
        based on having determined that the newer operational transformation has occurred in the base version of the document since retrieval, initialize a background copy of the retrieved base version of the document from the binary large object representation of the base document and update the background copy of the base document with the newer operational transformation until the background copy of the base document matches a last known state of the base version of the document; and
        based on the background copy of the base version of the document matching the last known state of the base version of the document, swap the background copy of the base version of the document for the active version of the document to present a new active version of the document having been updated with the operation not recognized by the operational transformation system and the newer operational transformation.

9. The system of claim 8, wherein the binary large object representation of the base document updated with the operation is not state-based.

10. The system of claim 8, wherein the base version of the document previously received the operation via a side-channel to the base version of the document, wherein the side-channel is a communication stream that is different from an operational communication stream used to transmit changes to the base version of the document.

11. The system of claim 8, wherein the binary large object representation of the base document includes one or more of: a picture, a video or an embedded object linking and embedding (OLE) object.

12. The system of claim 8, wherein the operation comprises a change to a shape attribute.

13. The system of claim 8, wherein the processor is further caused to:
   determine that operational transformations in the active version of the document have occurred that are not present in the last known state of the base version of the document; and
   apply the operational transformations in the active version of the document that are not present in the last known state of the base version of the document to the background copy of the base version of the document, and
   wherein the swap of the background copy of the base version of the document for the active version of the document presents the new active version of the document having additionally been updated with the operational transformations in the active version of the document that were not present in the last known state of the base document.

14. The system of claim 8, wherein the newer operational transformation, which is recognized by the operational transformation system, comprises creating an object, deleting an object, moving an object or editing text.

15. An article of manufacture in the form of computer storage media, the computer storage media storing instructions that when executed by a computer cause the computer to:
   synchronize an active version of the document with a base version of the document, the synchronization including application of a first document change previously made to the base version of the document to the active version of the document, the first document change comprising an operational transformation;
   receive an instruction to resynchronize the active version of the document with the base version of the document that has been updated with an operation not recognized by an operational transformation system;
   based on receipt of the instruction, retrieve a binary large object representation of the base document updated with the operation;
   based on having made the retrieval, determine that a newer operational transformation, which is recognized by the operational transformation system, has occurred in the base version of the document since the retrieval;
   based on having determined that newer operational transformation has occurred in the base version of the document since retrieval, initialize a background copy of the retrieved base version of the document from the binary large object representation of the base document and update the background copy of the base document with the newer operational transformation until the background copy of the base document matches a last known state of the base version of the document; and
   based on the background copy of the base version of the document matching the last known state of the base version of the document, swap the background copy of the base version of the document for the active version of the document to present a new active version of the document having been updated with the operation not recognized by the operational transformation system and the newer operational transformation.

16. The article of manufacture of claim 15, wherein the binary large object representation of the base document updated with the operation is not state-based.

17. The article of manufacture of claim 15, wherein the base version of the document previously received the operation via a side-channel to the base version of the document, wherein the side-channel is a communication stream that is different from an operational communication stream used to transmit changes to the base version of the document.

18. The article of manufacture of claim 15, wherein the binary large object representation of the base document includes one or more of: a picture, a video or an embedded object linking and embedding (OLE) object.

19. The article of manufacture of claim 15, wherein the computer is further caused to:
   determine that operational transformations in the active version of the document have occurred that are not present in the last known state of the base version of the document; and
   apply the operational transformations in the active version of the document that are not present in the last known state of the base version of the document to the background copy of the base version of the document, and
   wherein the swap of the background copy of the base version of the document for the active version of the document presents the new active version of the document having additionally been updated with the operational transformations in the active version of the document that were not present in the last known state of the base document.

20. The article of manufacture of claim 15, wherein the newer operational transformation, which is recognized by the operational transformation system, comprises creating an object, deleting an object, moving an object or editing text.

* * * * *